(12) United States Patent
De Oliveira

(10) Patent No.: US 12,737,409 B2
(45) Date of Patent: Sep. 15, 2026

(54) METHOD AND APPARATUS FOR AUTOMATED CREATION OF SEARCH PATTERNS

(71) Applicant: Siemens Healthineers AG, Forchheim (DE)

(72) Inventor: Andre De Oliveira, Uttenreuth (DE)

(73) Assignee: Siemens Healthineers AG, Forchheim (DE)

( * ) Notice: Subject to any disclaimer, the term of this patent is extended or adjusted under 35 U.S.C. 154(b) by 0 days.

(21) Appl. No.: 18/432,410

(22) Filed: Feb. 5, 2024

(65) Prior Publication Data

US 2024/0265045 A1 Aug. 8, 2024

(30) Foreign Application Priority Data

Feb. 7, 2023 (DE) ............................ 102023200969

(51) Int. Cl.
*G06F 16/383* (2019.01)
*G06F 11/07* (2006.01)

(52) U.S. Cl.
CPC ........ *G06F 16/383* (2019.01); *G06F 11/0736* (2013.01); *G06F 11/0793* (2013.01)

(58) Field of Classification Search
CPC . G06F 16/383; G06F 11/0736; G06F 11/0793
See application file for complete search history.

(56) References Cited

U.S. PATENT DOCUMENTS

2005/0193004 A1* 9/2005 Cafeo ................. G06F 16/2358
2015/0169288 A1* 6/2015 Yamamoto ............. G06F 16/25 707/752
2015/0372855 A1* 12/2015 Kushmerick ........... H04L 67/10 709/224
2016/0239487 A1* 8/2016 Potharaju .......... G06F 16/24578
2018/0333132 A1* 11/2018 Noda ................... A61B 6/5264
2019/0155709 A1 5/2019 de Oliveira et al.
2020/0005069 A1* 1/2020 Wang ....................... G06N 3/09
2020/0089983 A1* 3/2020 Manickam ........... G06N 3/0464
2022/0138777 A1* 5/2022 Ulla ......................... G06N 7/00 705/7.31

(Continued)

FOREIGN PATENT DOCUMENTS

EP 3486675 A1 5/2019

OTHER PUBLICATIONS

Zhukova, Nataly A. et al: “The Method for Searching Patterns In Log Files of Telecommunication Devices for Monitoring their State”; In: 2021 XXIV International Conference on Soft Computing and Measurements (SCM). IEEE, 2021. S. 124-126. doi: 10.1109/SCM52931.2021.9507157.

(Continued)

*Primary Examiner* — William P Bartlett
(74) *Attorney, Agent, or Firm* — Harness, Dickey & Pierce, P.L.C.

(57) ABSTRACT

One or more example embodiments of the present invention describes a method for automated creation of search patterns on the basis of entries in a knowledge database. One or more example embodiments of the present invention further describes a search pattern dataset, a device for automated creation of search patterns, a problem solving method, a creation method, a training dataset and a device system.

13 Claims, 4 Drawing Sheets

(56) References Cited

U.S. PATENT DOCUMENTS

| | | | | |
|---|---|---|---|---|
| 2024/0122555 | A1* | 4/2024 | Pawlak | A61B 6/03 |
| 2024/0126419 | A1* | 4/2024 | Makhijani | G06F 3/04845 |
| 2024/0211330 | A1* | 6/2024 | Branton | G06F 11/0766 |
| 2025/0013519 | A1* | 1/2025 | Gao | G06F 11/0778 |
| 2025/0285749 | A1* | 9/2025 | Naik | G06F 11/0733 |

OTHER PUBLICATIONS

Lin Qingwei et al:“Log clustering based problem identification for online service systems.” Proceedings of the 38th International Conference on Software Engineering Companion. 2016. S.102-111. doi: 10.1145/2889160.2889232.
“pytesseract 0.3.10”, in: https://pypi.org/project/pytesseract/#description [abgerufen am Jan. 24, 2024].

* cited by examiner

FIG 3

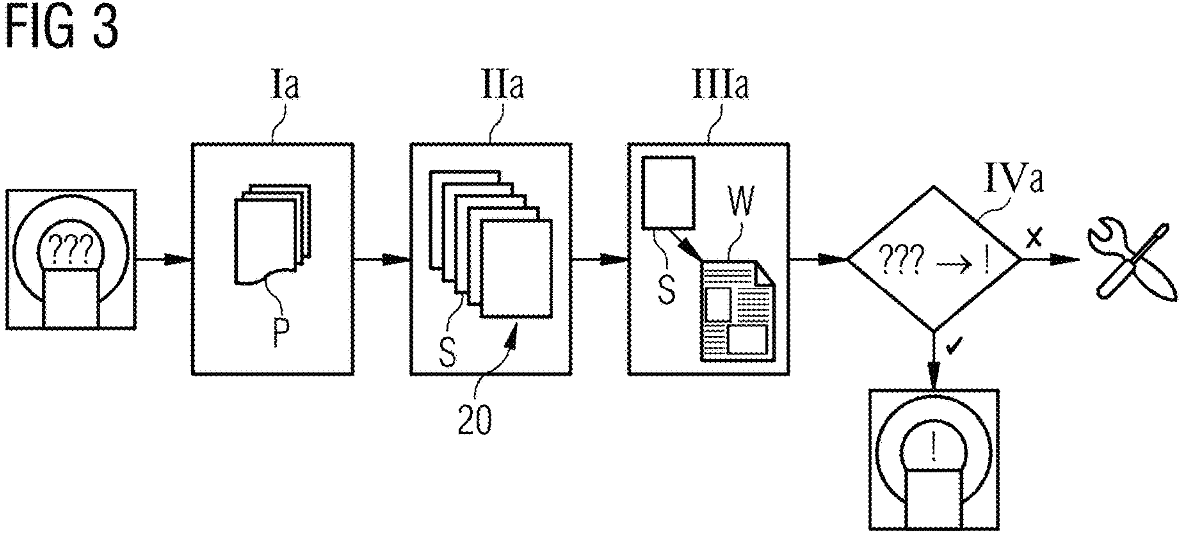

User was taking the patient out of the gantry and heard a noise.
Since then no more connection to the gantry. ← F
Event Viewer shows: L 03:16:56.127 CT_SAF_E_4 Error happened when operating on safety circuit.
'Safety Circuit Close TimeOut' L 03:16:56.134 CT_SAF_I_13 Safety circuit is opened or cannot be closed.
The whole reason string in HEX is '2, 2, 1a, 1a, 4, 3, 4, 3, 0'. L 03:16:56.14 CT_SAF_E_144 Safety circuit 'cannot be closed' by 'PM@TCB'.
The reason from Protection Module is 'TRIP_SELFTEST_TEMP_FAULT'.

and also ← Y L

03:29:05.770 CT_SAF_E_130 Safety circuit 'cannot be closed' by 'PM@TCB'.
The reason from Protection Module is 'TRIP_SELFTEST_SDO_POW1_ON_FAULT'.

METHOD AND APPARATUS FOR AUTOMATED CREATION OF SEARCH PATTERNS

CROSS-REFERENCE TO RELATED APPLICATION(S)

The present application claims priority under 35 U.S.C. § 119 to German Patent Application No. 10 2023 200 969.2, filed Feb. 7, 2023, the entire contents of which is incorporated herein by reference.

FIELD

One or more example embodiments relates to a method and an apparatus for automated creation of search patterns for automated problem analyses and/or problem solutions and an automated creation of training datasets for training a machine learning model, such as for medical technology systems. One or more example embodiments of the present invention also relates to a search pattern dataset with search patterns, a problem solving method based upon these search patterns and a creation method for automated creation of a training dataset on the basis of these search patterns and a training dataset created in this way and a device system, in particular a medical technology system which offers an automated problem solution or the creation of a training dataset.

RELATED ART

With the advent of machine learning-capable models, early attempts were made to utilize them in the domain of customer service. However, such models require a large quantity of training data in order to be capable of meaningful use. Although there is often a very large amount of knowledge available regarding processes and possible errors in a device system, this knowledge is stored in the form of images or texts that a person can easily understand, but which are not suitable for training a machine learning-capable model.

An example of a database with such knowledge is the Siemens Knowledge Base (SKB). This wiki-like intranet site enables service technicians to create entries in the form of a free-form text, possibly with images which describe known system behavior, causes of errors and corresponding solutions. Typically, these entries are checked by other users and have a high level of quality. In many cases, the diagnostic process includes the observation of machine data (protocol files and/or log files) and the search for particular key concepts which can occur in a particular order or within a particular time period. This search demands a great deal of experience. A user must firstly pre-suppose a particular problem in order then to be able to search in the knowledge database in a targeted manner. In the case of inexperienced users, a problem solution can thus take a very long time or not occur at all.

In many knowledge databases, an added difficulty is that the entries are made by different specialists who have different approaches to the wording of texts and that sometimes no fixed format exists for the composed texts.

There are methods in which a trained machine learning-capable model (also designated AI for "artificial intelligence") is used in order to search for patterns in protocol files and to present results to a user. An example of this is the so-called "coil companion" (see EP 3 486 675 A1).

SUMMARY

Something that presents a great challenge is the digital support or digitization of a customer service. For example, it is desirable that on occurrence of an error in a medical technology system, this is automatically recognized and a solution can be provided quickly.

The problem with these AI algorithms lies however in the fact that they typically require a large quantity of training data, as stated above, and that a significant effort is needed for training and for fine-tuning such an algorithm.

One or more example embodiments of the present invention provides a method and an apparatus for automated creation of search patterns, which overcomes the disadvantages of the prior art, and enables an automated problem analysis and/or problem solution or an automated creation of training datasets for training a machine learning model. Furthermore, one or more example embodiments of the present invention provides a search pattern database with such search patterns and/or a training dataset created in this way.

This is achieved via at least a method according to one or more example embodiments, a search pattern dataset according to one or more example embodiments, an apparatus for automated creation of search patterns according to one or more example embodiments, a problem solving method according to one or more example embodiments, a creation method according to one or more example embodiments, a training dataset according to one or more example embodiments and a device system according to one or more example embodiments.

BRIEF DESCRIPTION OF THE DRAWINGS

One or more example embodiments of the present invention will now be described again using exemplary embodiments, making reference to the accompanying drawings. In the various drawings, the same components are provided with identical reference signs. The drawings are in general not to scale. In the drawings:

FIG. 3 shows an example of a sequence of a problem solving method according to one or more example embodiments of the present invention, FIG. 4 shows an exemplary search text.

DETAILED DESCRIPTION

Figure 1:
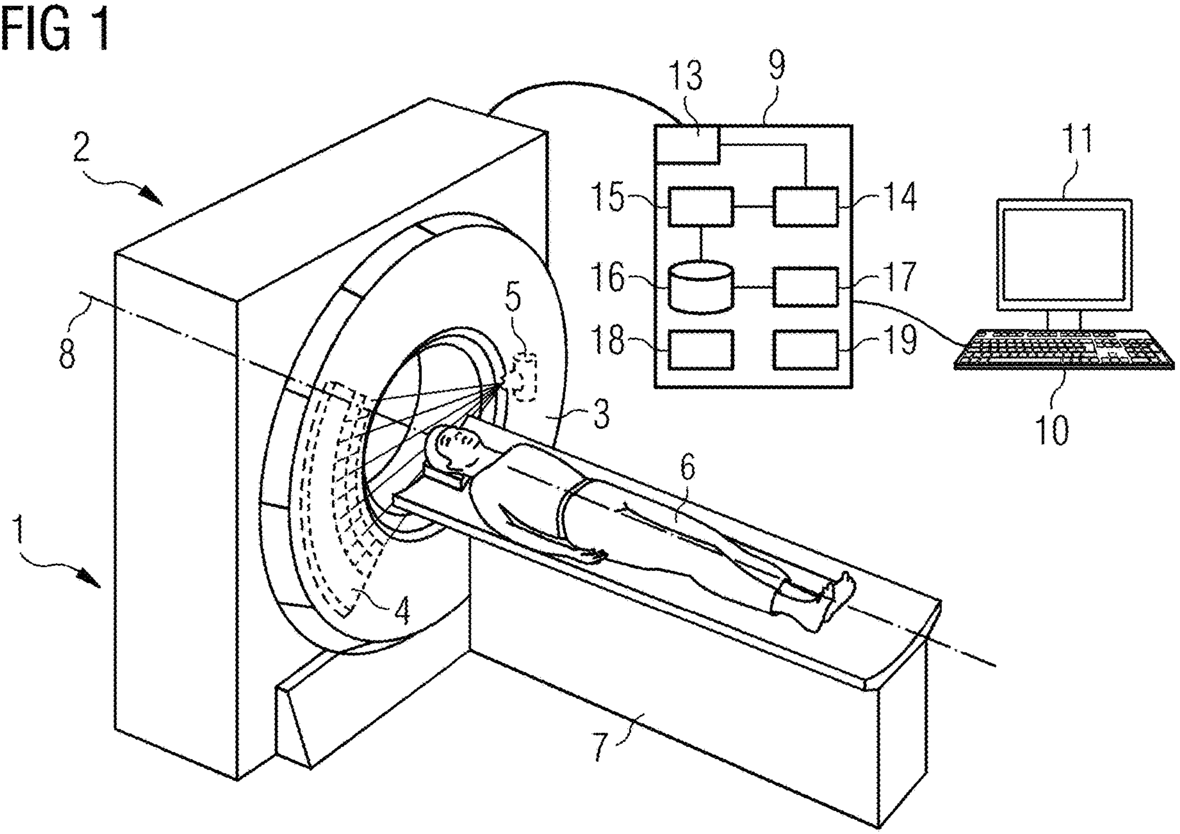
FIG. 1 shows an exemplary embodiment of a device system in the form of a medical technology imaging system.

One or more example embodiments has as its basis using information from a knowledge database such as, for example, the Siemens Knowledge Base in order to create search patterns automatically that can be used on protocol files (log files) of a device system, in particular a medical technology device system. Via these search patterns, the protocol files can be searched through in an automated and targeted manner and therefrom, problem solutions can be derived or training datasets can be created automatically. A knowledge database is a database in which entries of a protocol file of a (particularly medical) device system are linked to problem analyses and/or problem solutions. As described above, such a knowledge database is known in the prior art and comprises a large number of different entries regarding diverse error conditions of the device system according to one or more example embodiments of the present invention. Each entry typically comprises a number of log passages (entries in the protocol files) which is relevant for the respective error condition under consideration, and also an explanatory text.

A device system can be, for example, a system for a medical examination, e.g. an MRI system or a CT system. It can comprise a single examination unit or a plurality of, possibly different, examination units. However, one or more example embodiments of the present invention is advantageous not only for a medical technology device system, but essentially for each device system which comprises devices which are intended to perform a task and which establishes and stores protocol data during the performance of the task.

The method according to one or more example embodiments of the present invention for automated creation of search patterns on the basis of entries in a knowledge database comprises the following steps:

a) loading an entry from the knowledge database and creating a search text from the entry,
b) identifying a log passage in the search text which can be associated with the text of a protocol file,
c) testing whether the identified log passage is relevant,
d) if the identified log passage is relevant, storing this log passage and continuing with step e) and if the identified log passage is not relevant, repeating steps b) and c) and identifying and checking a further log passage until no further log passage can be identified,
e) checking whether the text that adjoins the identified log passage in the search text indicates a linkage of log passages,
f) if a linkage of log passages is indicated, storing this linkage together with a statement regarding to which log passage(s) it relates,
g) repeating the steps b) to f) with further log passages until a termination condition is reached,
h) after reaching the termination condition, generating a search pattern on the basis of the stored log passages and stored linkages.

The knowledge database is available and permits access to its entries. On access to an entry, it is loaded. From a loaded entry from the knowledge database, its text (meaning all the characters thereof, including digits or special characters) is extracted. This is then the search text. In the event that the entry consists exclusively of text, the entry would already correspond to the search text. If images are present in the entry, they must not necessarily be incorporated into the search text, although it is advantageous if text in images (e.g. screen shots) were recognized, for example via OCR, and incorporated into the search text. Preferably, therefore, for creating the search text for a pictorial representation of a text in an entry in the knowledge database, an automated text recognition is carried out and the recognized text is added to the search text at the relevant site in the pictorial representation. It should be noted that on every access to a stored file, it is copied into the store of the accessing instance and this is thereby created. In practice, in order to create the search text, a simple interface is used for the access to the knowledge database.

It is advantageous if the search text is a stand-alone dataset, but it can also be processed directly with the entry in the knowledge database as a search text. For easy comprehension of one or more example embodiments of the present invention, it can be imagined that the text of an entry in the knowledge database (possibly recognized via OCR) is copied and is inserted as a search text into a stand-alone working document. However, as the creation of the search text, a simple access to the entry in the knowledge database can be sufficient.

Typically, search texts contain extracts from a protocol file (also "log file") which hereinafter are designated "log passages". Preferred log passages comprise, for example, character strings from textual entries of a protocol file, in particular plain text or general character strings. However, they can also comprise additional or alternative parameter values, in particular from the parameters of the group temperature, pressure, voltage, current, humidity, speed, noise level and magnetic field. A structure that is often used begins with a text that denotes an error condition (e.g. "component X in device failed") followed by log passages which indicate this error condition and has been copied from the protocol file. Therein, a log passage can be present, or a plurality of log passages which are possibly semantically connected to one another via linkages (e.g. "and (additionally)" or "or"). A search text often also comprises solution proposals for ending the error condition and producing a normal operation of the device system. Even if a log passage can be a relatively large extract of a protocol file, it is preferred that the individual log entries of the protocol file are regarded as log passages.

The identification of a log passage in the search text can take place in that its text (that is, its letters, digits and special characters) is checked for known character strings. Log entries often begin with a time stamp or with defined character strings for different aspects of the device system, e.g. a numerical code, a name or character string such as "CT_SAF_I-#", where # represents a number. A line break can be regarded as the end of a log entry, or a fixed character string which indicates the end. If a log passage begins with a time specification, then searching in the search text can be undertaken according to time specifications after which, possibly, a defined character string follows. In one example, a log passage always begins with a time stamp followed by an identification passage which has special characters such as "_" and particular key characters. The search text can then be specifically checked for these.

In this way, a log passage can be recognized in the search text. After a log passage has been recognized, checking takes place whether the identified log passage is relevant. A relevance is dependent upon specifications regarding the structure of the knowledge database. In the case where it is predetermined that only relevant log passages may be incorporated into the entries in the knowledge database, each identified log passage can also be relevant at the same time. It can however also be the case that adjacent log passages may be incorporated into the entries in the knowledge database, although relevant log passages must be specifically identified, for example, by emphasizing the corresponding log passage. In this case, it can be tested whether the log passage is emphasized, in particular by another color, a different background or a different representation of the characters, e.g. underlined, italic, bold, or a different font or size. The corresponding information items can be derived, in particular, from an HTML ("hypertext markup language") representation of the search text. The checking therefore always depends upon specifications for representing relevant log passages in the knowledge database. On creation of the search text, it should be noted that if it is copied into a dataset, an emphasizing of the characters is also adopted.

Summarizing, during a check whether an identified log passage is relevant, it is checked whether a previously known specification for representing a relevant log passage in the knowledge database is fulfilled. Otherwise, other emphasized passages which are not log passages can be taken account of in the method and stored and/or adopted into the search pattern.

Now, an identified log passage can be relevant or irrelevant. If the identified log passage is not relevant, the preceding steps are carried out and the next log passage is identified (if present). If the log passage is relevant, it is stored in a storage place and the method is continued.

If a relevant log passage has been identified, then it could be that it is linked to a further relevant log passage, e.g. with a Boolean operation such as "AND" or "OR". Thus, the text that adjoins the identified log passage in the search text is checked for such a linkage. This can occur simply in that this text is checked according to predetermined character strings such as "and", "or", "additionally", "solely", "exclusively", "only" or ",". In principle, a search is made for a key passage which indicates a linkage, wherein the key passage belongs to a predetermined group of key passages. It is preferred that the text checked in this regard is limited, in particular only a predetermined number of successive lines or the text as far as the next log passage.

In the event that the checking resulted in a linkage, this linkage is stored together with a statement regarding to which log passage(s) it relates.

This is then repeated until a (predetermined) termination condition is reached. This is preferably reached when the entire search text has been processed according to the method, and/or all the log passages have been identified. It is preferable that the method begins at the start of the search text and ends at the end of the search text.

Lastly, a search pattern is generated on the basis of the stored log passages and indicated linkages. This search pattern is therein preferably constructed from key sites of the relevant log passages and possibly Boolean operations (e.g. AND, OR). As key sites of the relevant log passages, for example, the character strings can be used which have also been used for identifying the log passages, wherein preferably characters which differentiate the relevant instances for the log passages from other instances in the search text can additionally be utilized. In the example set out above that a log passage begins with the characters "CT_SAF_I-#", the number "#" could indicate an instance and represent the differentiating characters. For the generation of the search pattern, rules are preferably available which specify which parts of a relevant log passage should be incorporated into the search pattern, for example, its identification.

As far as a time specification in a log passage is concerned, although it should not be used as a key site, it can be advantageous also to absorb the relative time between relevant log passages into the search pattern. If, for example, two relevant log passages are found that lie 10 minutes apart, the search pattern can be designed such that thus temporally spaced log passages should be specifically searched for.

It is preferred that together with a (each) search pattern, an information item is stored which specifies from which entry in the knowledge database the search pattern has been created and/or to which error condition the search pattern relates. It is also preferred that the stored information also contains an indication regarding the solution to the problem.

A search pattern dataset according to one or more example embodiments of the present invention comprises a plurality of search patterns which have been created in accordance with the method according to one or more example embodiments of the present invention. It preferably comprises key sites from relevant log entries for each search pattern, in particular together with Boolean operations and/or time specifications. Particularly preferably, the search pattern dataset comprises information items for each search pattern contained therein, which specifies from which entry in the knowledge database the relevant search pattern was created and/or to which error condition the search pattern relates. It is also preferred that an indication regarding the solution to the problem is available.

The apparatus according to one or more example embodiments of the present invention for the automated creation of search patterns in accordance with the method according to one or more example embodiments of the present invention comprises the following components:

- a data interface designed for loading an entry from the knowledge database and for creating a search text from the entry,
- a collecting unit designed for identifying a log passage in the search text, which can be associated with the text of a protocol file, and to check whether the identified log passage is relevant,
- a linkage unit designed for checking whether a text that adjoins the identified log passage in the search text indicates a linkage of log passages,
- a storage unit designed for storing identified log passages and a recognized linkage together with an indication to which log passage(s) they relate,
- a search pattern unit designed to generate a search pattern on the basis of stored log passages and stored linkages.

The function of the units has been described above. The collecting unit is therein designed to decide whether the identified log passage is relevant and then to store it in the storage unit.

A problem solving method according to one or more example embodiments of the present invention for solving a problem of a device in a device system uses a search pattern dataset according to one or more example embodiments of the present invention and a corresponding knowledge database for this device system (on the basis of which the search pattern dataset has been created). It comprises the following steps:

- in the event of a problem with a device: providing a number of protocol files from the device,
- searching through the number of protocol files via the search pattern of the search pattern dataset for entries which correspond to the search pattern,
- if an entry in a protocol file corresponds to a search pattern of the search pattern dataset: selecting the entry in the knowledge database from which the search pattern originates or selecting an error condition which is linked to the search pattern,
- representing the selected information or a proposal for solving the problem.

The problem solving method is not intended for solving any arbitrary problems, but for solving problems which are already in the knowledge database and for which a solution has been described there. The problem solving method is also not intended for solving problems with any arbitrary device, but for devices of a device system to which the knowledge database relates. As has already been stated above, a knowledge database is created by experts for a particular device system. They record entries therein which describe problems that have occurred and offer solutions. The problem solving method which makes use of a search pattern dataset that has been created from this knowledge database is thus designed for solving problems of this device system that are known there.

If a problem exists with a medical device, it is identified by a user. This person is typically not an expert and can make use of the problem solving method in that he makes available to a unit that can carry out this problem solving method (e.g. a suitably programmed computing unit) a number of protocol files of the device. The protocol files should therein contain the last recorded protocol files so that the problem can also be readily recognized. It is, however, advantageous also to offer protocol data from a preceding time period in the event that the problem has previously made itself apparent.

In the context of the problem solving method, protocol data is investigated for entries that correspond to the search patterns of the search pattern dataset. It should be noted in this regard that each search pattern originates from an entry in the knowledge database, and thus is linked to a particular problem and its solution.

It is also preferred in the context of the problem solving method that on searching through the protocol data via the search pattern, only search patterns of the search pattern dataset that relate to a predetermined error condition (e.g. are linked thereto) are used. The search patterns can be linked directly to a (specific) error condition or to an entry in the knowledge database, whereby in the latter case, the entries concerned can be searched through for error conditions. Preferably, a user can specify an error condition, e.g. "coil A failed" and then only search patterns from the search pattern dataset which relate to this error condition are used. This has the advantage that the effort for carrying out the problem solving method is reduced.

It is very likely that for a problem, if it occurs a second time in a device, the same or at least similar, entries are stored in the protocol file. Therein, the first time, it could also have been a problem in an identical device of the device system or an identical device of another device system, the main point being that the entries in the protocol file are identical or similar.

If an entry in a protocol file corresponds to a search pattern of the search pattern dataset, this means that this entry of the protocol file is already to be found somewhere in the knowledge database. This also means, however, that a problem that is connected to the relevant entry in the protocol file has already been considered there. Thus, the corresponding entry in the knowledge database from which the search pattern originates can now be made use of.

This can occur in that the knowledge database is now searched through with the corresponding search pattern. It is, however, preferred that an information item is already associated with each search pattern, from which entry in the knowledge database it has been created or to which error condition the search pattern relates (in particular together with the problem solution that has been proposed in the corresponding entry in the knowledge database).

Thus, the selected entry in the knowledge database or an information item relating to the error condition can be represented or, if linked to the relevant search pattern, a proposal for solving the problem can be presented. The solution does not necessarily have to lead to the rectification of the problem, but rather can also be, for example "Device defective. Repair needed". Then, however, an operating person has at least received the information that continued searching for a problem solution is not necessary.

One or more example embodiments of the present invention is, however, not restricted solely to a problem solution, but can also be used for automated creation of a training dataset for training a machine learning-capable model. This machine learning-capable model is designated briefly below merely as "model". The structure of these models is known and a serious problem is often too small a number of the training datasets available for training.

Each training dataset must contain data for a particular situation and a basic truth (also known as "ground truth"), which represents what this situation is in reality. For example, for training a model which is intended to decide whether an apple is shown in an image, the training dataset should comprise many images and for each image the information (ground truth) as to whether an apple is depicted therein or not.

In the present case, the model should be trained to recognize an error condition of the device system automatically in a protocol file (and possibly propose a solution) and/or predict a possible error condition. The training data must therefore comprise entries from protocol files of the device system or of an identical device system or at least of the device or an identical device, together with a ground truth regarding the error condition in question. This can certainly be done manually, although it will lead to a very small training dataset and/or take a very long time to generate a sufficiently large training dataset.

It should be noted that an error condition preferably corresponds to an error in a function of a component (device) of the device system, in particular, a non-functioning of the component. The error condition is preferably taken directly from a relevant entry in the knowledge database.

The method presented below serves to create such a training dataset for training a machine learning-capable model to predict a number of error conditions in a device system in an automated manner.

A creation method according to one or more example embodiments of the present invention comprises the following steps:

- providing a search pattern dataset, wherein associated with each search pattern (of the search pattern dataset) is an error condition which has been derived from the entry in the knowledge database, from which the search pattern has been generated,
- providing a large number of protocol files of a number of similar device systems,
- automatic searching through the protocol files for passages which contain one of the search patterns of the search pattern dataset,
- on a finding of a search pattern in a protocol file: forming a training dataset from part of the protocol file which, starting from the passage in which the search pattern has been found, extends a predetermined timespan into the past, and from the error condition that is associated with the relevant search pattern, as a ground truth.

The search pattern dataset provided is preferably a search pattern dataset according to one or more example embodiments of the present invention. However, it can also have been created individually by selecting a number of error conditions, and for each error condition: providing a number of search patterns comprising log passages with character strings and/or parameter values of a protocol file which are associated with the relevant error condition.

It is important that each search pattern is associated with an error condition since this will serve later as a ground truth.

Later, the training data is derived from the large number of protocol files. In this regard, it should be noted, however, that typically not every protocol file shows the same error conditions. It is not even necessary for the protocol file to show any error condition (the ground truth would then be, for example, "error-free"). It is preferred, however, that at least more than half of the protocol files originate from devices which have an error condition so that, for the training data, sufficient examples are available for the number of error conditions.

On searching through the protocol files with the search patterns, passages can be found which contain one of the search patterns of the search pattern dataset. The relevant protocol files are important for the training data.

If a search pattern is found in a protocol file, it should be noted that an error condition is assigned to this search pattern. This can thus be assigned as a ground truth. Then, a "training dataset" is formed which comprises data for a training step (many training datasets then together form the training data). In order to create a training dataset, a part of the relevant protocol file is taken. This is not any arbitrary part, but rather the part which starts from the passage in which the search pattern has been found, and then extends a predetermined timespan into the past. Therein, the aforementioned passage can be part of the training dataset, although this is not essential. The training dataset then comprises this part together with the error condition which is associated with the relevant search pattern, as a ground truth.

Training data according to one or more example embodiments of the present invention comprises a plurality of training datasets which have been created in accordance with the method according to one or more example embodiments of the present invention.

An evaluation unit according to one or more example embodiments of the present invention for automated estimation of a probability of the existence of a number of predetermined error conditions in a future time period comprises a machine learning-capable model designed for capturing protocol data as input and for the output of a probability of a future error condition. This model has been trained with the training data according to one or more example embodiments of the present invention. A training can also be associated with the creation method, wherein after the creation of a training dataset, the model is trained therewith.

Preferably, the evaluation unit comprises a filter unit which is designed for filtering protocol data according to predetermined parameters and/or character strings and/or a predetermined negative list. This filter unit therefore ensures that only particular entries to the protocol file are adopted into the training dataset.

An evaluation method according to one or more example embodiments of the present invention with an evaluation unit according to one or more example embodiments of the present invention comprises the following steps:

- providing a protocol file of a device system,
- input of the protocol file into the evaluation unit, in particular a filtered protocol file,
- processing the protocol file by way of the evaluation unit,
- output of an estimate of a probability of the existence of a number of predetermined error conditions in a future time period.

A device system according to one or more example embodiments of the present invention is, in particular, a medical technology device system and comprises a unit (e.g. a computing system) which is designed to carry out the problem solving method and/or the creation method according to one or more example embodiments of the present invention for training datasets.

A majority of the aforementioned components of the system can be realized entirely or partially in the form of software modules in a processor of a corresponding computing system, for example, by a control device of a medical technology system. A realization largely through software has the advantage that conventionally used computing systems units can also easily be upgraded by way of a software update in order to operate in the manner according to one or more example embodiments of the present invention. In this respect, the object is also achieved by way of a corresponding computer program product with a computer program which can be loaded directly into a computing system, having program portions in order to carry out the steps of the method according to one or more example embodiments of the present invention, at least the steps that can be executed by a computer when the program is executed in the computing system. Such a computer program product can comprise, apart from the computer program, additional components, if relevant, such as for example, documentation and/or additional components including hardware components, for example, hardware keys (dongles, etc.) in order to use the software.

For transport to the computing system and/or to the control device and/or for storage on or in the computing system and/or the control device, a computer-readable medium, for example, a memory stick, a hard disk or another transportable or firmly installed data carrier can be used on which the program portions of the computer program which can be read in and executed by a computing system are stored. For this purpose, the computing system can have, for example, one or more cooperating microprocessors or suchlike.

Further particularly advantageous embodiments and developments of one or more example embodiments of the present invention are disclosed by the dependent claims and the following description, wherein the claims of one claim category can also be further developed similarly to the claims and description passages relating to another claim category and, in particular also, individual features of different exemplary embodiments and/or variants can be combined to new exemplary embodiments and/or variants.

FIG. 1 shows an embodiment of a (medical technology) imaging system 1 as an example for a device system 1 with a radiation detector 4 and a radiation source 5. The radiation source 5 is designed to irradiate the radiation detector 4 with radiation. The device system 1 shown is designed in this example as a computed tomography device. The computed tomography device comprises a gantry 2 with a rotor 3. The rotor 3 comprises, as the radiation source 5, an X-ray source, and the radiation detector 4 which is designed to detect X-ray radiation.

The rotor 3 is rotatable about the rotation axis 8. The examination object 6, in this case a patient, is positioned on the patient support 7 and is movable along the rotation axis 8 through the gantry 2. In order to control the imaging system 1 and/or to generate an X-ray image dataset on the basis of signals detected by the radiation detector 4, the computing unit 9 is provided, which is also configured as an apparatus 9 according to one or more example embodiments of the present invention.

In the case of a computed tomography device, typically a (raw) X-ray image dataset of the object 6 is recorded from a large number of angular directions via the radiation detector 4. Subsequently, on the basis of the (raw) X-ray image dataset, via a mathematical method, for example comprising a filtered back projection or an iterative reconstruction method, a final X-ray image dataset can be reconstructed.

The computing unit 9 can comprise a control unit for controlling the imaging system 1 and a generating unit for generating an X-ray image dataset.

Furthermore, an input facility 10 and an output facility 11 are also connected to the computing unit 9. The input facility 10 and the output facility 11 can, for example, enable an interaction by way of a user or the representation of a generated X-ray image dataset or can output a problem solution that has been established.

The computing unit 9 is designed as an apparatus 9 for automated creation of search patterns S and additionally comprises an evaluation unit 18 and a problem solving unit 19. The search patterns S are therein based upon entries in a knowledge database W in which entries in a protocol file P of a device system 1 are linked to problem analyses and/or problem solutions. The apparatus comprises the following components (in this regard, see also FIG. 2):

A data interface 13 designed for loading an entry from the knowledge database W and for creating a search text R from this entry W.

A collecting unit 14 designed for identifying a log passage L in the search text R, which can be associated with the text of a protocol file P. The collecting unit 14 is additionally designed to check whether the identified log passage L is relevant for the respective problem.

A linkage unit 15 designed for checking whether a text X that adjoins the identified log passage L in the search text R indicates a linkage Y of log passages L.

Thus the collecting unit 14 "collects" relevant log passages L and the linkage unit 15 collects linkages Y between these log passages L.

A storage unit 16 designed for storing identified log passages L and a recognized linkage Y together with an indication to which log passage(s) L it relates. As the storage unit 16, a suitable unit of the device system can certainly be used.

A search pattern unit 17 designed for generating a search pattern S on the basis of stored log passages L and stored linkages Y. For this search pattern unit, rules can certainly be available which specify which parts of a relevant log passage should be incorporated into the search pattern, for example, the identification ID (see FIG. 5).

The evaluation unit 18 (see, for example, FIG. 8) serves for automated estimation of a probability of the existence of a number of predetermined error conditions F in a future time period and comprises a machine learning-capable model designed for capturing protocol data P as input and for the output of a probability of a future error condition F. This model has been trained with training data T which has been generated as shown in FIG. 6.

Figure 6:
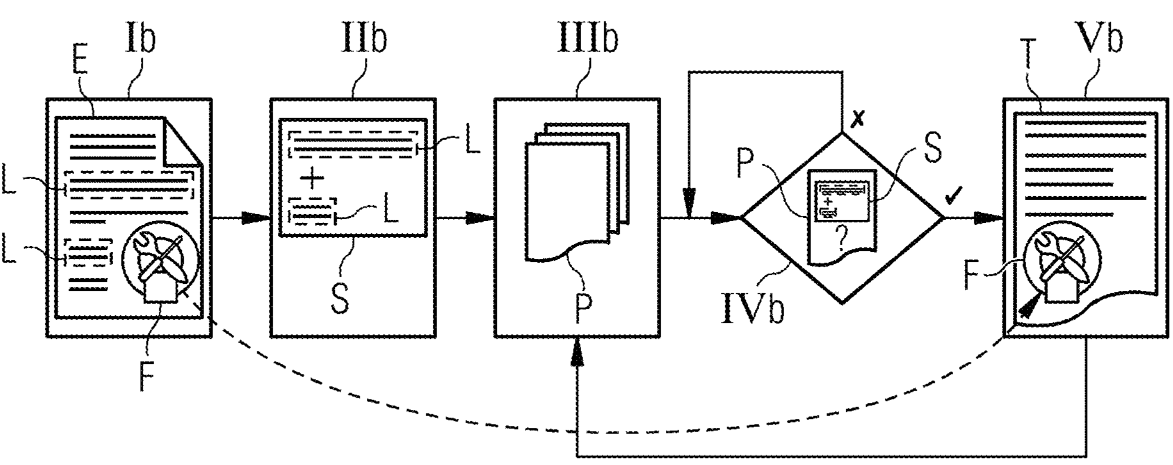
FIG. 6 shows an exemplary creation method for automated creation of a training dataset.

The problem solving unit 19 serves to solve a problem of the imaging system 1 with a search pattern dataset 20 which has been created with the apparatus 9 is represented according to a problem solving method, as shown in FIG. 6.

Figure 2:
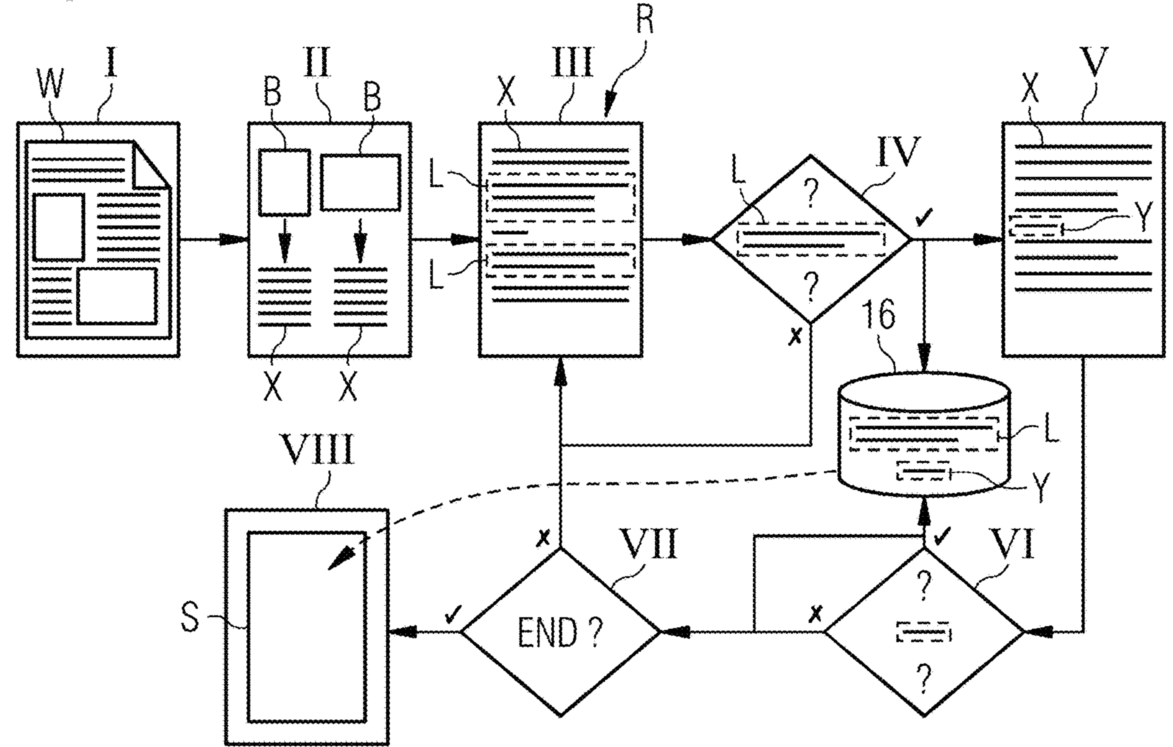
FIG. 2 shows an example of a sequence of a method according to one or more example embodiments of the present invention for automated creation of search patterns.

FIG. 2 shows an example of a sequence of a method according to one or more example embodiments of the present invention for the automated creation of search patterns S on the basis of entries in a knowledge database W in which log passages L of a protocol file P of a device system 1 (as, for example, FIG. 1 shows) are linked to problem analyses and/or problem solutions. The method comprises the following steps:

In step I, an entry in the knowledge database W is loaded.

In step II, images B of the entry W are checked for text X and this is recognized via OCR.

In step III, a search text R is created from the entry in the knowledge database W, which comprises text X and, in this case, no images B. In this text X, log passages L are present which are, in principle, only special sites in the text X. In the example shown, two log passages L are present in the text X which are identified one after the other.

In step IV, it is checked whether the respectively identified log passage L in the search text R is relevant, that is, for example, is particularly emphasized. If the identified log passage L is relevant (check mark), this log passage L is stored in the storage unit 16 and the method is continued. If the identified log passage L is not relevant (x), a return to step III takes place and the next log passage L is identified until no further log passage L can be identified.

In step V, a text X is identified which adjoins the respective identified log passage L in the search text R.

In step VI, it is checked whether this text indicates a linkage Y of log passages L. If yes (check mark), this linkage Y is stored in the storage unit 16 and the method is continued. If no linkage Y exists (x), the method is continued without any action.

In step VII, it is checked whether a termination condition has been reached, e.g. the end of the search text R, and if this termination condition has not been reached, a return to step III takes place and the next log passage L is identified.

After reaching the termination condition, in step VIII, a search pattern S is generated which is based upon the stored log passages L and the stored linkages Y.

The method is preferably carried out multiple times with a plurality of entries in the knowledge database W and the search patterns S generated are grouped together into a search pattern dataset 20.

FIG. 3 shows an example of a sequence of a problem solving method according to one or more example embodiments of the present invention for solving a problem with a device in a device system 1 (e.g. as shown in FIG. 1) with a search pattern dataset 20 of this type and a corresponding knowledge database for the device system 1. The problem solving method comprises the following steps:

Firstly, a problem exists in the device system. For example, in an imaging system 1 according to FIG. 1, a warning notification can appear or the imaging system 1 simply no longer functions. The problem is unknown, as is indicated with the question mark.

In step Ia, a number of protocol files P is provided. This can be a single log file which has been stored immediately before the occurrence of the problem. Specifically, the problem can have been notified early in a protocol file P, although the most up-to-date entries in a protocol file P are often the most relevant.

In step IIa, the number of protocol files P provided is checked via the search patterns S of the search pattern dataset 20 for entries that correspond to the search pattern S.

If, as shown in step IIIa, an entry in a protocol file P corresponds to a search pattern S of the search pattern dataset 20, the entry in the knowledge database W from which the search pattern S originates is selected. Alternatively, an error condition F could be selected which is linked to the search pattern S, e.g. "X-ray source defective".

In step IVa, it is additionally checked whether the problem could be solved according to the entry in the knowledge database. If so, this solution is represented and the imaging system 1 can be further operated after applying this solution and, if not, then a technician must be called in. This can also be represented as a notification.

FIG. 4 shows an exemplary search text R as could be created from an entry in the knowledge database W. Although in the drawing, the text X consists of English words, the entry W can be present in exactly this way. In the introductory part, an error condition F is mentioned in this case. A user heard a sound while a patient was exiting the gantry 2 and then the connection to the gantry 2 was interrupted. This error condition F can preferably be extracted and linked to a search pattern S.

Thereafter, there follows the text X which is not relevant for the search pattern S, but can certainly be used as a notification that log passages probably now follow. Three log passages L, which can easily be recognized by way of their time stamp t at the start (see FIG. 5) and their identification ID, also follow. In this search text R, the third of these log passages L is emphasized, which is represented with a dashed box. A further log passage L is also subsequently emphasized (box). These two log passages L are linked to one another. This linkage Y is automatically recognized by the method (see FIG. 2) by way of the "and also" as a logical AND linkage.

Figure 5:
FIG. 5 shows an exemplary log passage.

FIG. 5 shows an exemplary log passage L as already previously set out with a time stamp t at the start, a subsequent identification ID and a text which describes a state of the device system 1.

For the search pattern S, in particular the time stamp t and the identification ID are decisive. For example, from the search text R of FIG. 4, the identifications ID "CT_SAF_E_144" and "CT_SAF_E130" are stored as search character strings which are connected for the search pattern with a logical AND, that is, they must both occur during the search.

In order to refine the search, the time difference of approximately 13 minutes can also be taken into account. This time difference can certainly be given during the search as a "time spacing of between 5 and 20 minutes".

In the context of a method for generating a search pattern S (see, for example, FIG. 2), following the loading of the entry from the knowledge database W and possibly the conversion of text in the images, a search text R would therefore be available, as shown in FIG. 4. Now, log entries are identified in that each line and/or each entry of the search text R is searched through. Herein, prior knowledge regarding log passages L can be used, for example:

- a log file entry begins with a time stamp t,
- a protocol data entry contains an identification ID. This can contain characters such as "_",
- there are particular keywords (e.g. "CT_SAF_").

This can be comprehended from FIG. 4. In this drawing, the relevant log passages L are also made recognizable (bordered) and, in practice, these can be, for example, given a yellow background or emphasized in bold. The emphasis can be different from user to user. Some users use, for example, a bold emphasis and others the color red, yet others, a yellow background. The method can check for a plurality of specific possibilities for emphasis or can check whether identified log passages L differ from the other text X.

In order to identify linkages in the text, text passages outside of the log passages L, in particular their subsequent text X can be investigated for particular keywords. In FIG. 4, for example, the pattern first log passage L, text X, second log passage L is to be seen. This text X can be searched through for particular keywords, for example, "and", "or", "additionally", "only" or "exclusively". Here, however, the language of the entry in the knowledge database W should be taken into account. In the case of FIG. 4, "and" or "and also" would be a useful key passage.

From this "and also", the logical linkage AND between the first relevant log passage L and the second relevant log passage L is derived.

Furthermore, as already stated above, it can be determined from the relevant log passages L that the time difference between these is approximately 15 minutes and this information should also be included in the search pattern.

As soon as the last line of the search text R (which can certainly be the entry in the knowledge database W) has been read (termination condition), the search pattern S can been created. When the search pattern S is generated on the basis of the search text R according to FIG. 4, the stored information would be accessed and predetermined rules for using parts of log passages would be accessed. An advantageous search pattern S would be, for example: "CT_SAF_E_144" AND "CT_SAF_E_130"; within a timespan of between 10 and 20 minutes.

If these two identifications ID are found in a protocol file P, a user can be connected to the corresponding entry in the knowledge database W or a solution named therein is notified to him.

FIG. 6 shows an exemplary creation method for automated creation of a training dataset T for training a machine learning-capable model (e.g. an evaluation unit 18) for predicting a number of error conditions F in a device system 1. The creation method comprises the following steps:

In step Ib, an entry in the knowledge database W is provided and the text X thereof is investigated according to the method according to FIG. 2 for log passages L and linkages Y. In principle, the method according to FIG. 2 is carried out, but the error condition is additionally identified (see statements relating to FIG. 4).

In step IIb, a search pattern S is created.

In step IIIb, a large number of protocol files P is provided.

In step IVb, this search pattern is applied to this large number of protocol files P and it is tested for each of the protocol files P, one after another, whether this search pattern S creates a finding there. If not, the next protocol file P is investigated.

In the event of a finding of a search pattern S in a protocol file P, in step Vb, a training dataset T is formed from part of the protocol file P which, starting from the passage in which the search pattern S has been found, extends a predetermined timespan into the past. In this training dataset, the error condition F is adopted as a ground truth, said error condition being associated with the relevant search pattern S (see dashed arrow).

Figure 7:
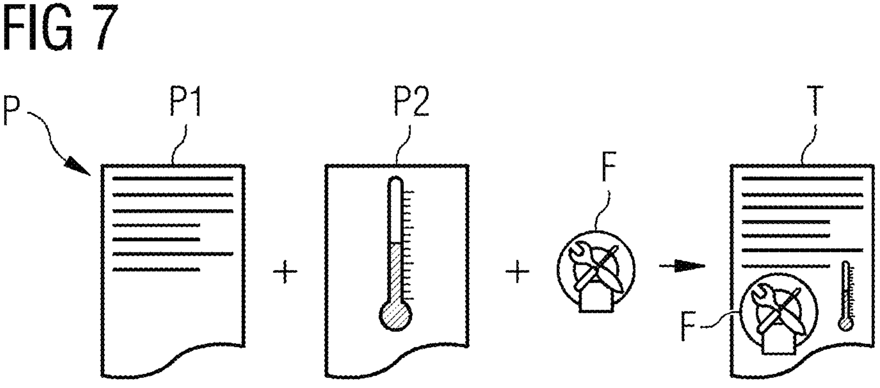
FIG. 7 shows a merging of a plurality of log files to a training dataset.

FIG. 7 shows a joining together of a plurality of log files to a training dataset T. Herein, for example, only the first log file P1 can be searched through with the search pattern, although the training dataset T is formed from parts of both log files P1, P2 which, starting from the passage in which the search pattern S was found, reach a predetermined timespan into the past. The error condition F, which is associated with the relevant search pattern S, is then adopted as a ground truth in this training dataset consisting of both log files P1, P2.

Figure 8:
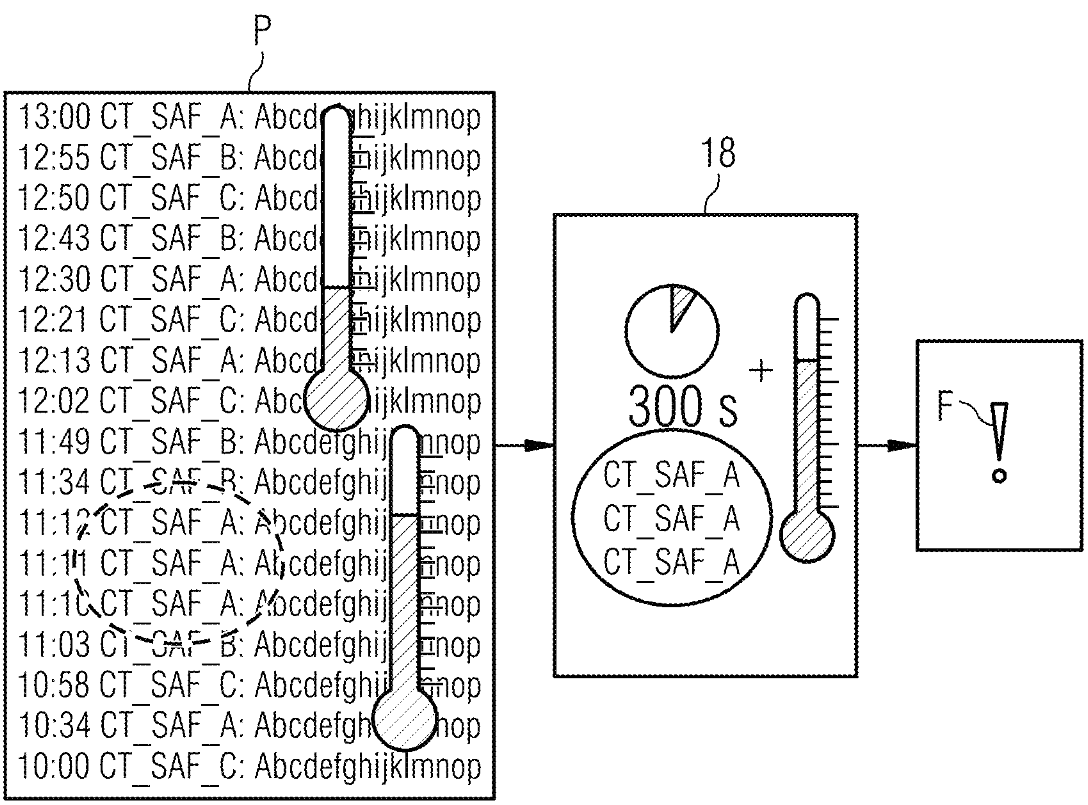
FIG. 8 shows an example of a sequence of an evaluation of a protocol file and the evaluation of an error probability.

FIG. 8 shows an example of a sequence of an evaluation of a protocol file P and the evaluation of an error probability with an evaluation unit 18. The evaluation unit 18 comprises a machine learning-capable model which has been trained with a large number of training datasets T which, for example, have been created with the creation method according to FIG. 6. In the box which symbolizes the evaluation unit 18, it is shown when the evaluation unit predicts a high error probability, specifically when a particular identification (here "CT_SAF_A") occurs three times within 300 s and the temperature is also elevated. This search pattern is found in the protocol file P (region bordered dashed). From this, a high probability is derived, that an error condition occurs some time soon, which is symbolized with a "!".

Finally, it should again be noted that the methods described above in detail and the imaging system 1 disclosed are merely exemplary embodiments which can be modified by a person skilled in the art in a wide variety of ways without departing from the scope of the invention. Furthermore, the use of the indefinite article "a" or "an" does not preclude the possibility that the relevant features can also be present plurally. Similarly, expressions such as "unit" do not preclude the relevant components consisting of a plurality of cooperating sub-components which can also be spatially distributed, if relevant. The expression "a number" is to be understood as meaning "at least one". Independent of the grammatical term usage, individuals with male, female or other gender identities are included within the term.

Although the present invention has been disclosed in the form of preferred embodiments and variations thereon, it will be understood that numerous additional modifications and variations could be made thereto without departing from the scope of the invention. For the sake of clarity, it is to be understood that the use of "comprising" does not exclude other steps or elements. The expression "a number of" means "at least one". The mention of a "unit" or a "device" does not preclude the use of more than one unit or device. The expression "a number of" has to be understood as "at least one".

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

Computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

Shared memory hardware encompasses a single memory device that stores some or all code from multiple modules. Group memory hardware encompasses a memory device that, in combination with other memory devices, stores some or all code from one or more modules.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The invention claimed is:

1. A method for automated problem solving with a search pattern dataset based on entries in a knowledge database in which stored log passages of a protocol file of a device system are linked to at least one of problem analyses or problem solutions, the method comprising:

training a machine learning model using at least a training dataset including a search pattern dataset; and creating the search pattern dataset, wherein the creating the search pattern dataset includes, a) loading an entry from the knowledge database, the entry including at least one of explanatory text, images, and protocol files, and creating a search text from the entry, the entry corresponding to a problem in an imaging system;

b) identifying a log passage in the search text, the search text associated with text of the protocol file;

c) testing whether the identified log passage is relevant;

d) storing the log passage if the identified log passage is relevant or repeating steps b) and c) and identifying and checking a further log passage until no further log passage can be identified if the identified log passage is not relevant;

e) indicating a linkage of log passages in response to a text that adjoins the identified log passage in the search text;

f) storing the linkage together with a statement regarding to which log passages the linkage relates;

g) repeating the steps b) to f) with further log passages until a termination condition is reached;

h) generating a search pattern based on the stored log passages and stored linkages after reaching the termination condition wherein the search pattern corresponds to a ground truth based on a problem described in an entry, wherein the ground truth includes the problem in the imaging system and a solution to the problem in the imaging system; and i) repeating the steps a) to h) for a plurality of entries in the knowledge database, wherein the search pattern dataset comprises the plurality of search patterns and the plurality of corresponding ground truths.

2. The method of claim 1, wherein the identifying the log passage includes searching the search text through for a number of known features of the log passages, the number of known features include one or more of the following elements:

a time stamp, an identification, a special character, or a predetermined keyword.

3. The method of claim 1, wherein the testing includes:

investigating whether the identified log passage differs from normal text.

4. The method of claim 1, wherein the checking whether the linkage of the log passages is indicated includes, searching a passage of the search text for predetermined key passages associated with corresponding linkages and, on recognition of at least one of the predetermined key passages, the corresponding linkage is associated with a preceding log passage.

5. The method of claim 1, wherein the search pattern is created based on text passages of the stored log passages.

6. A computer program product comprising commands which, when executed by a processor, cause said processor to perform the method of claim 1.

7. A non-transitory computer-readable storage medium comprising commands which, when executed by a computer, cause said computer to perform the method of claim 1.

8. The method of claim 3, wherein the investigating includes at least one of a colored emphasis of the log passage, an emphasis of a background of the log passage or a use of a textual emphasis.

9. The method of claim 8, further comprising:

adopting a particular emphasis in the testing in the entry in the knowledge database during a creation of the search text to check whether an identified log passage is relevant.

10. The method of claim 5, wherein two different log passages are linked to one another with a linkage based on a corresponding linkage between the two different log passages being indicated in the search text.

11. The method of claim 10, wherein the search pattern is additionally based upon time information items which are linked to the log passages.

12. The method of claim 11, wherein the search pattern is based upon a time difference between time stamps of two or more log passages.

13. The method of claim 1, wherein the imaging system is a medical imaging system.

* * * * *